US011187356B2

(12) United States Patent
Potier

(10) Patent No.: US 11,187,356 B2
(45) Date of Patent: Nov. 30, 2021

(54) NON-PRELOADED THREADED PIPE CONNECTION FOR TEMPORARY HIGH PRESSURE PIPING

(71) Applicant: Nelco Energy Services LLC, Erath, LA (US)

(72) Inventor: Nelson Potier, Erath, LA (US)

(73) Assignee: NELCO ENERGY SERVICES LLC, Erath, LA (US)

( * ) Notice: Subject to any disclaimer, the term of this patent is extended or adjusted under 35 U.S.C. 154(b) by 524 days.

(21) Appl. No.: 16/070,477

(22) PCT Filed: Dec. 16, 2016

(86) PCT No.: PCT/US2016/067258
§ 371 (c)(1),
(2) Date: Jul. 16, 2018

(87) PCT Pub. No.: WO2017/106702
PCT Pub. Date: Jun. 22, 2017

(65) Prior Publication Data
US 2019/0024829 A1    Jan. 24, 2019

Related U.S. Application Data

(60) Provisional application No. 62/269,675, filed on Dec. 18, 2015.

(51) Int. Cl.
*F16L 19/00* (2006.01)
*F16L 19/02* (2006.01)

(52) U.S. Cl.
CPC ......... *F16L 19/005* (2013.01); *F16L 19/0212* (2013.01); *F16L 19/0231* (2013.01); *Y10T 29/49826* (2015.01)

(58) Field of Classification Search
CPC .. F16L 19/005; F16L 19/0212; F16L 19/0231
(Continued)

(56) References Cited

U.S. PATENT DOCUMENTS 2,805,873 A    9/1957  Brennan et al.
2,880,019 A  * 3/1959  Wurtz ................. F16L 19/0212
(Continued)

FOREIGN PATENT DOCUMENTS

DE         3924173 A1    1/1991
JP      2015224673 A   12/2015

OTHER PUBLICATIONS

International Search Report and Written Opinion of the International Searching Authority dated Mar. 13, 2017 in related International Application No. PCT/US2016/067258, 9 pages.
(Continued)

*Primary Examiner* — Zachary T Dragicevich
(74) *Attorney, Agent, or Firm* — Gesmer Updegrove LLP

(57) ABSTRACT

A temporary piping system is disclosed for use in a high pressure fluidic system. The temporary piping system including a connection pin including a first sealing surface, a connection box including external threads and a second sealing surface for engaging the first sealing surface of the connection pin to create a fluidic seal, an outer sleeve including internal threads for threadingly engaging the external threads of the connection box to secure the box with respect to the inner pipe to maintain the fluidic seal, and a locking system for preventing the connection box from being separated from the connection pin.

18 Claims, 19 Drawing Sheets

(58) Field of Classification Search
USPC .......................................... 285/92, 354, 386
See application file for complete search history.

(56) References Cited

U.S. PATENT DOCUMENTS

| | | | |
|---|---|---|---|
| 4,012,059 A | | 3/1977 | Luke et al. |
| 4,209,193 A | | 6/1980 | Ahlstone |
| 4,801,160 A | * | 1/1989 | Barrington ............ F16L 19/005 285/354 |
| 4,993,755 A | | 2/1991 | Johnston |
| 5,390,963 A | | 2/1995 | Namekawa |
| 8,690,200 B1 | | 4/2014 | Patterson, Jr. |
| 2002/0008386 A1 | | 6/2002 | Lee |
| 2004/0061329 A1 | | 4/2004 | Guest |
| 2005/0179186 A1 | | 8/2005 | Genot et al. |
| 2005/0258640 A1 | | 11/2005 | Otten et al. |
| 2006/0151994 A1 | * | 7/2006 | Marc .................... F16L 19/005 285/92 |
| 2009/0160186 A1 | * | 6/2009 | McGuire ............. F16L 19/0231 285/354 |
| 2010/0117360 A1 | | 5/2010 | Chan |
| 2012/0326439 A1 | | 12/2012 | Bogert et al. |
| 2014/0374122 A1 | * | 12/2014 | Fanguy |
| 2015/0137513 A1 | * | 5/2015 | Glime, III ........... F16L 19/0212 |
| 2017/0152978 A1 | * | 6/2017 | Leeth .................... F16L 19/005 |

OTHER PUBLICATIONS

International Preliminary Report on Patentability issued by the International Bureau of WIPO dated Jun. 19, 2018 in related International Application No. PCT/US2016/067258, 7 pages.

* cited by examiner

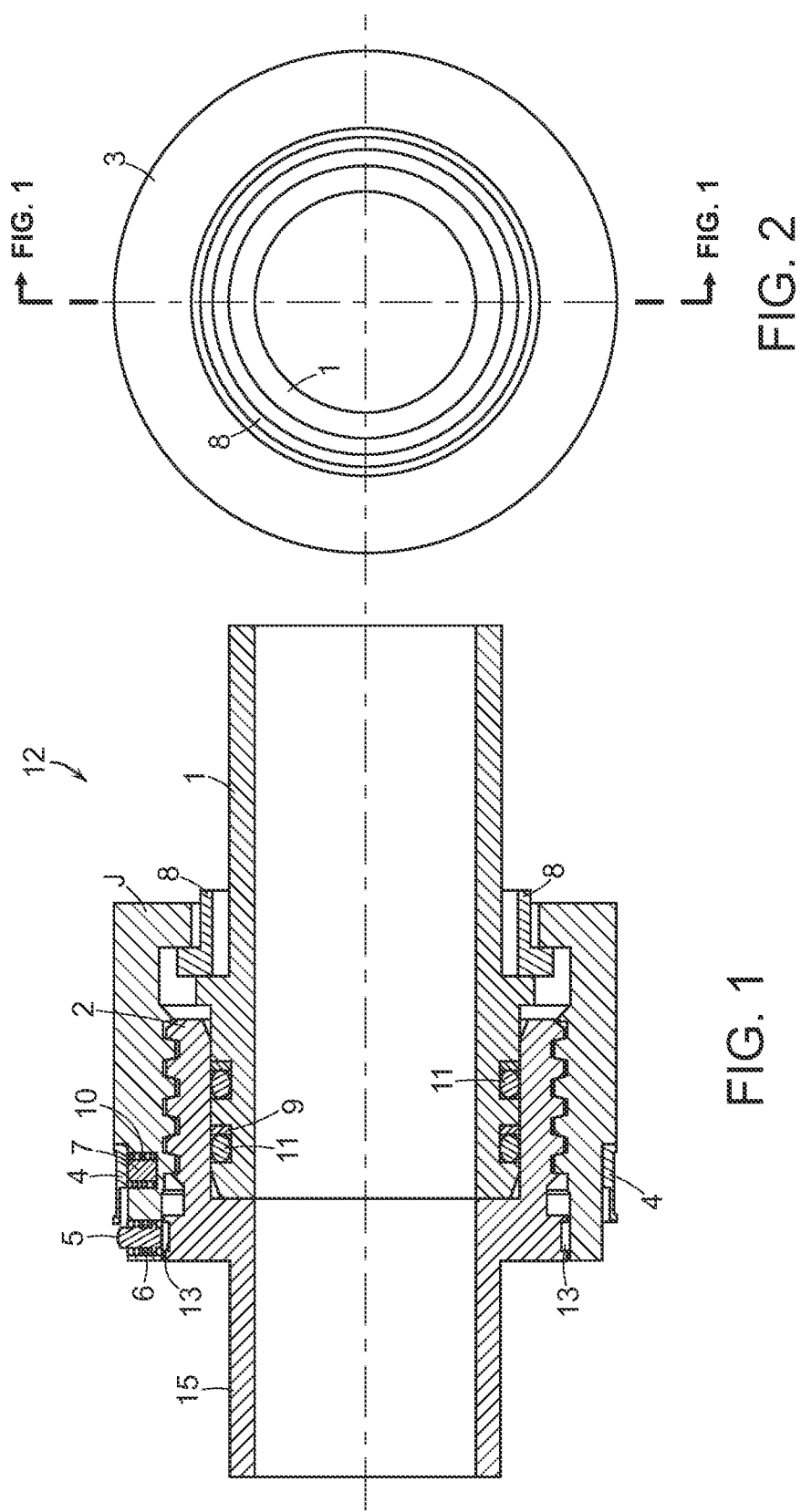

NON-PRELOADED THREADED PIPE CONNECTION FOR TEMPORARY HIGH PRESSURE PIPING

PRIORITY

The present application claims priority to Patent Cooperation Treaty Ser. No. PCT/US2016/067258 filed Dec. 16, 2016, which claims priority to U.S. Provisional Patent Application Ser. No. 62/269,675 filed Dec. 18, 2015, the disclosures of which are hereby incorporated by reference in their entirety.

BACKGROUND

The invention generally relates to temporary piping systems, and relates in particular to temporary piping systems for use in high pressure fluid transfer systems.

There is a constant need of temporary piping systems (steel pipe and hose) for transfer of fluids, in most cases under significant pressures, in the energy services industry, including the oil and gas industries. Due to the temporary nature of these systems, and the need to assemble and disassemble pipe systems rapidly and often, it is desirable for the pipe connections to be both easy and quick to make up.

A commonly used connection in such systems is the hammer union, such as the Weco 1505 Hammer Union as sold by FMC Technologies of Houston, Tex. The hammer union connection utilizes a threaded connection with a seal that requires significant preload to maintain the seal under pressure. To create the preload in the connection, a sledge hammer is used to apply extreme force to the tabs or ears (small extrusions that protrude from the side of connection) of the connection. The use of the hammer has caused a large number of injuries specifically to hands. Due to the rough nature of the hammer union, the life of outer sleeve of the connection that contains the "ears" is relatively short and requires frequent inspection and replacement.

There remains a need therefore, for an improved connection system for temporary piping that does not require the use of such preloading.

SUMMARY

In accordance with an embodiment, the invention provides a temporary piping system for use in a high pressure fluidic system. The temporary piping system including a connection pin including a first sealing surface, a connection box including external threads and a second sealing surface for engaging the first sealing surface of the connection pin to create a fluidic seal, an outer sleeve including internal threads for threadingly engaging the external threads of the connection box to secure the box with respect to the inner pipe to maintain the fluidic seal, and a locking system for preventing the connection box from being separated from the connection pin.

In accordance with another embodiment, the invention provides a method of providing temporary piping in a high pressure fluidic system. The method includes the steps of providing a connection pin including a first sealing surface, providing a connection box including external threads and a second sealing surface for engaging the first sealing surface of the connection pin to create a fluidic seal, providing an outer sleeve including internal threads for threadingly engaging the external threads of the connection box to secure the box with respect to the inner pipe to maintain the fluidic seal, and preventing the connection box from being separated from the connection pin using a locking system.

BRIEF DESCRIPTION OF THE DRAWINGS

The following description may be further understood with reference to the accompanying drawings in which:

FIG. 1 shows an illustrative diagrammatic side sectional view of a non-preloaded threaded pipe connection in accordance with an embodiment of the present invention including an anti-rotation pin and a lock pin, taken along line A-A of FIG. 2;

FIG. 2 shows an illustrative diagrammatic inner pipe end view of the non-preloaded threaded pipe connection of FIG. 1;

Figure 4:
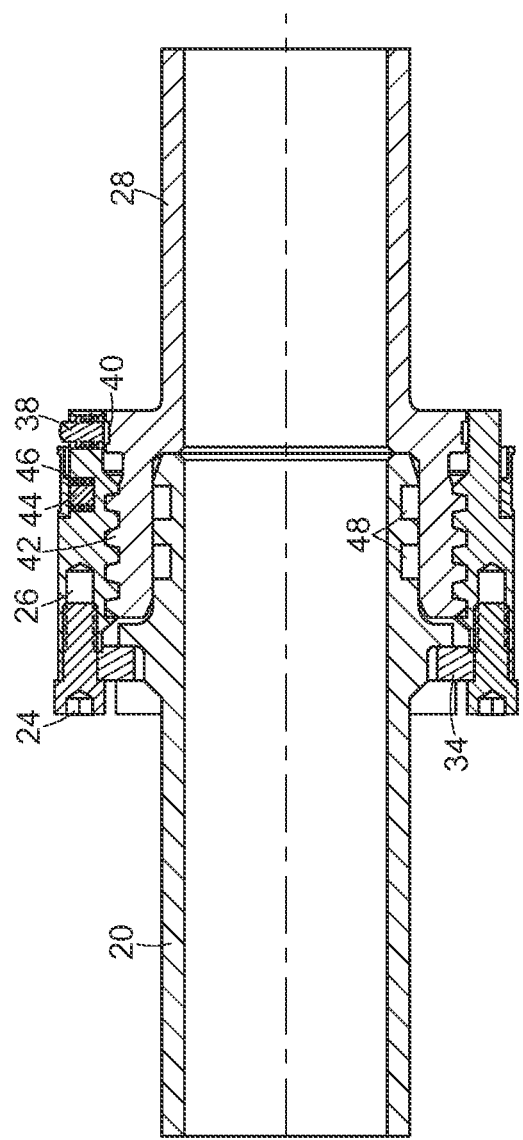
FIG. 4 shows an illustrative diagrammatic side sectional view of the pipe connection of FIG. 3 taken along line B-B thereof.

The drawings are shown for illustrative purposes only.

DETAILED DESCRIPTION

An intent the design of various embodiments of the present invention is to provide a pipe connection and seal that can be made up by hand without the use of a hammer but still have a sealing capacity equivalent to or greater than that of the hammer union. In accordance with certain embodiments, the connection utilizes mating threads to ensure a high capacity. The threads may be either single start or multiple start threads. The seal may be either elastomer seals or metal-to-metal seals.

Generally, the connection consists of three main components: a pin that contains the seal glands and a load shoulder, a box that contains the seal bore as well as external threads, and outer sleeve that contains internal threads that mate with the external threads on the box and a load shoulder that mate with a load shoulder on the pin. The threads may be straight threads or set on a taper for better load distribution. The connection also contains a positive lock mechanism that prevents the outer sleeve from uncoupling with the box.

FIGS. 1 and 2, for example, show an embodiment of the present invention that combines a box and pin for a temporary connection, for example, in the field of oil and gas extraction and processing. The system 12 includes a connection pin (or inner pipe) 1 on which is mounted a spacer ring 8 that is sandwiched between the connection pin 1 and an outer sleeve 3. The outer sleeve 3 includes internal threads that mate with external threads on a connection box 15. When the connection box 15 is threaded into the connection pin 1 and outer sleeve 3 assembly, seal rings 9 and seal backup rings 11 effect a seal between the interior of the connection box 15 with the connection pin 1. The seal ring 8 also facilitates the seal and acts to maintain the connection.

Additionally, when the connection pin 1 and connection box 15 are secured, a spring loaded anti-rotation pin 5 is secured into a recess 13 (of which there may be several around the connection box). A positive lock ring 4 is then slide along the outer sleeve 3 over the depressed anti-rotation pin 5, and a spring loaded lock pin 7 secures the lock ring 4 in place by being released behind the lock ring 4 by way of a wave spring 10.

Initially, therefore, with the outer sleeve assembly retracted away from the pin load shoulder, the seal end of the pin is inserted into the seal bore of the box. With the pin fully seating in the box, the outer sleeve is threaded on to the box until the load shoulder on the outer sleeve lands out on the load shoulder on the pin. Once the outer sleeve is fully engaged, the anti-rotation pin is then depressed to engage the box and the positive lock ring is moved over the anti-rotation pin until the positive lock pin is extended to prevent the positive lock ring from moving back into the neutral position allowing the anti-rotation pin extend and disengage from the box.

In particular, the connection pin 1 is received within the connection box 15 and a seal is formed between the seal rings 11 and the inner surface of the box 2. The outer sleeve 3 is then threaded over the external threads of the box 2 and the internal shoulder of the outer sleeve engages an external shoulder of the inner pipe via the spacer ring 8 to secure the connection pin 1 to the connection box 15. Again, the anti-rotation pin 5 then secured into a recess on the outside of the box, the retaining ring 4 is then slid over the pin 5, and lock pin 7 is then released to lock the retaining ring 6 in place.

During use, the connection pin and the connection box may each be coupled to pipes that are desired to be connected together, and the connection pins and connection boxes may be attached to the pipe by for example, any of welding, threading (with threads tapped onto each part), or force fit with a large force. In some examples, certain pipes of valves may include either a connection pin or a connection box already attach to the part.

To uncouple the connection, the positive lock pin is depressed to allow the positive lock ring to slide back and over the positive lock pin. This allows the anti-rotation pin to extend and disengage from the box. The outer sleeve is then unthreaded from the box allowing the pin to be removed from the box.

Figure 3:
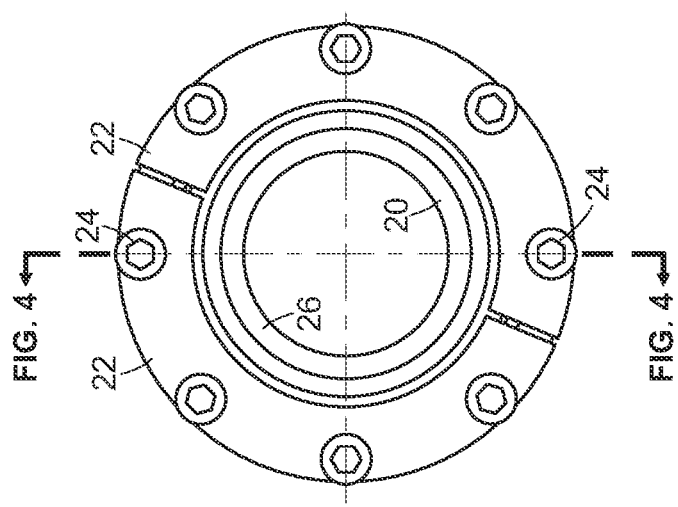
FIG. 3 shows an illustrative diagrammatic outer sleeve end view of the non-preloaded threaded pipe connection in accordance with another embodiment of the present invention including an anti-rotation pin and a flanged lock pin.

FIGS. 3 and 4 show another embodiment of the present invention that combines a box and pin for a temporary connection. The system 21 includes a connection pin 20 and attached outer sleeve 22 that receives a connection box 28. Similar to the system 12 of FIGS. 1 and 2, the connection pin 20 may include recesses 48 that include seal rings and backup rings. Similar to the embodiment of FIGS. 1 and 2, the outer sleeve 22 of the connection pin 20 includes threads that mate with threads 36 of the connection box.

Figure 5:
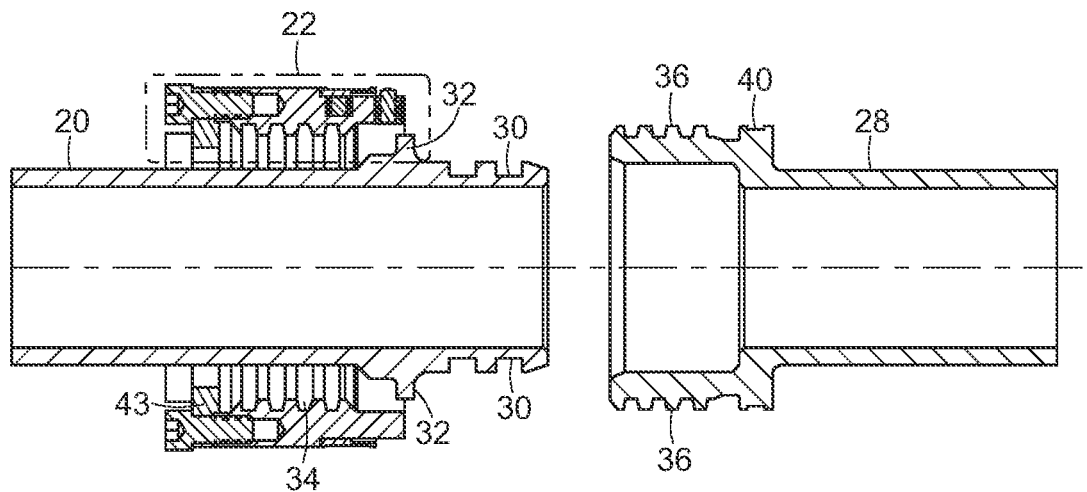
FIG. 5 shows an illustrative diagrammatic side sectional view similar to that shown in FIG. 4 with the inner pipe and outer sleeve uncoupled.
Figure 6:
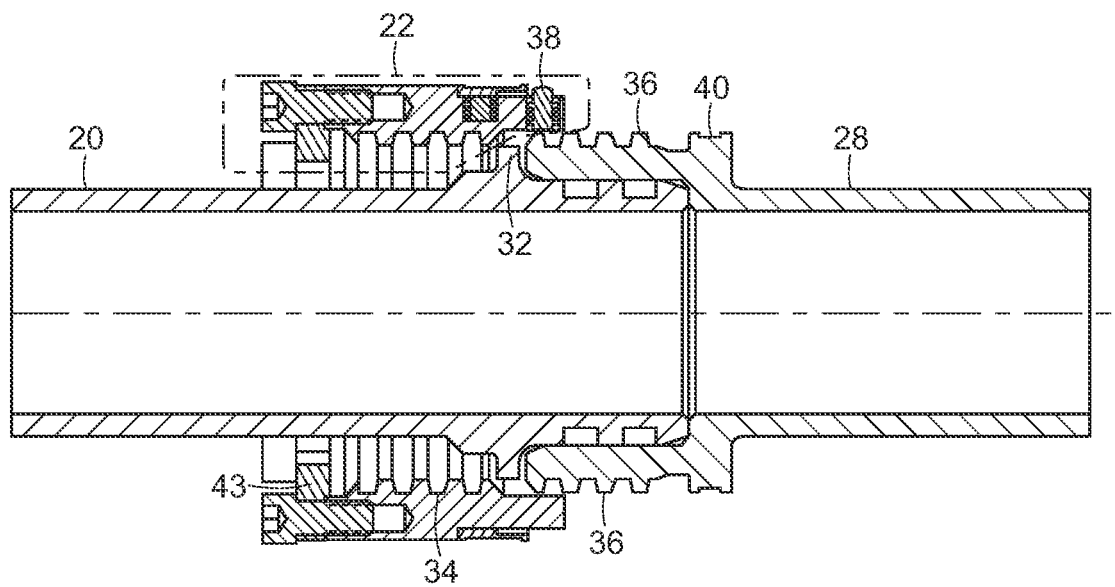
FIG. 6 shows an illustrative diagrammatic side sectional view similar to that shown in FIG. 4 with the inner pipe and outer sleeve beginning to engage one another.
Figure 7:
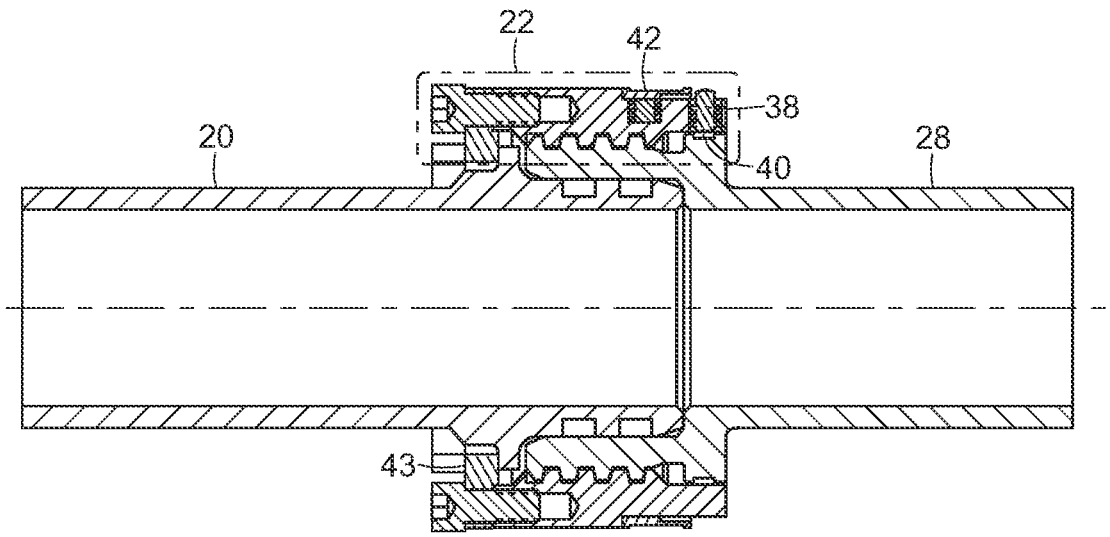
FIG. 7 shows an illustrative diagrammatic side sectional view similar to that shown in FIG. 4 with the inner pipe and outer sleeve coupled.
Figure 8:
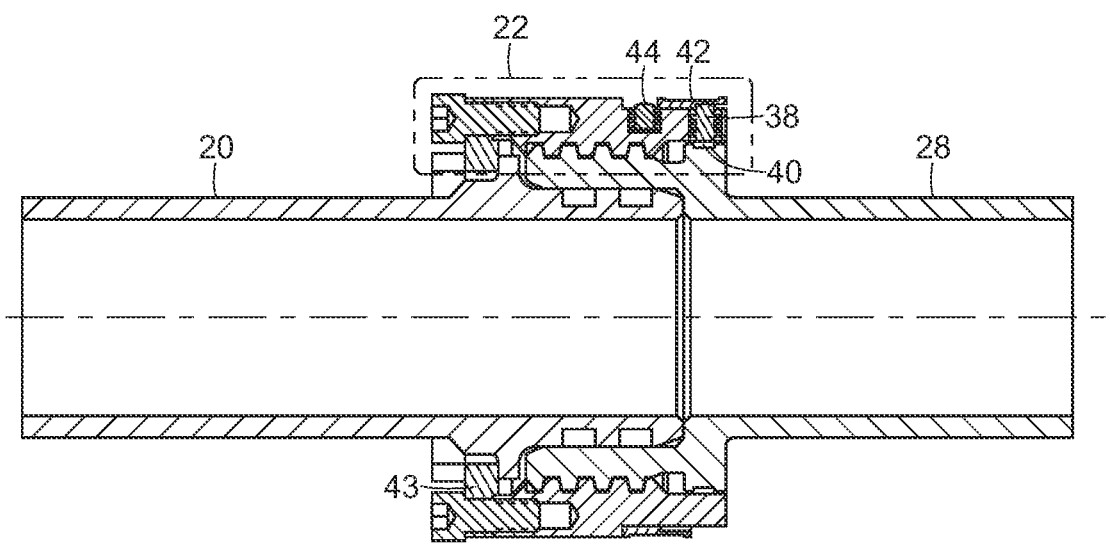
FIG. 8 shows an illustrative diagrammatic side sectional view similar to that shown in FIG. 4 with the inner pipe and outer sleeve beginning coupled and locked.
Figure 9:
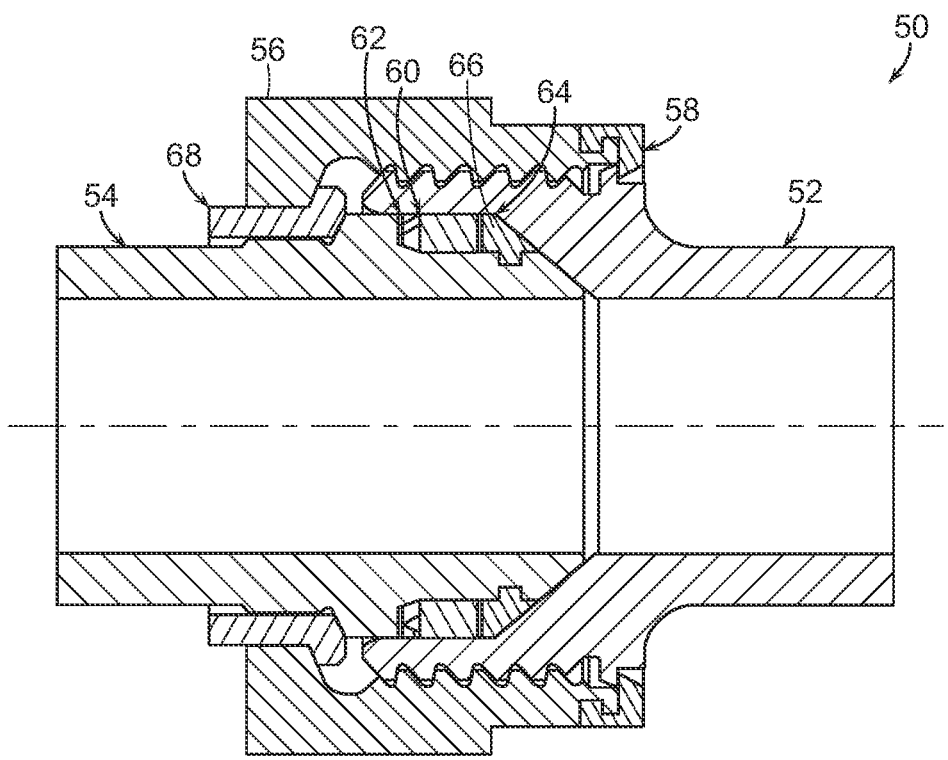
FIG. 9 shows an illustrative diagrammatic side sectional view of a non-preloaded threaded pipe connection in accordance with a further embodiment of the present invention including a split seal ring.

In particular, FIG. 5 shows the connection pin 20 and the connection box 28 prior to attachment. The two parts are joined (as shown in FIG. 6), and the threads 36 on the connection box are mated with the threads on the interior of the outer sleeve 22. Once coupled, and with reference to FIG. 7, a spring loaded anti-rotation pin 38 on the outer sleeve 22 is pressed into a recess 40 in the connection box to prevent the connection box from being rotated with respect to the connection pin. As shown in FIG. 8, a positive lock ring 42 is then slid along the outer sleeve 22 to cover the anti-rotation pin 38, and once so moved, a lock pin 44 is released (by a compression or wave spring), to keep the positive lock ring 42 in place over the anti-rotation spring 38.

In this embodiment, the connection pin 20 is received within the connection box 28 up to the load shoulder 32 of the connection pin 20, and a seal is formed between the outer surface (e.g., including O-rings in recesses 36) of the connection pin 20 and the inner surface of the connection box 28. The outer sleeve 22 is threaded over the external threads of the connection box 28 and an external shoulder of the connection pin engages a spacer ring 34 that is secured to the outer sleeve 22 by the bolts 24. Anti-rotation pin 38 secured into the recess 40 on the outside of the box, the retaining ring 46 is then slid over the pin 38, and the ring lock pin 44 is then released to lock the retaining ring 46 in place.

In accordance with various embodiments therefore, the invention provides a temporary piping system for use in a high pressure fluidic system. The temporary piping system includes an inner pipe including a first sealing surface, a box including external threads and a second sealing surface for engaging the first sealing surface of the inner pipe to create a fluidic seal, and an outer sleeve including internal threads for threadingly engaging the external threads of the box to secure the box with respect to the inner pipe to maintain the fluidic seal.

In further embodiments, the inner pipe includes an external shoulder that engages an inner shoulder of the box, or the inner pipe includes an external shoulder that indirectly engages an internal shoulder of the outer sleeve, for example the external shoulder of the inner pipe may engage the internal shoulder of the outer sleeve via a spacer ring.

In further embodiments, the outer sleeve includes at least one securing unit (such as a bolt) for securing the spacer ring against the shoulder of the inner pipe, and the outer sleeve may include a locking pin for securing the outer sleeve with respect to the box when the locking pin is in a locked position. The outer sleeve may further include a retaining ring that secures the locking pin in the locked position when the retaining ring is in a retaining position, and outer sleeve may further include a ring lock pin that secures the retaining ring in the retaining position. In further embodiments, the first sealing surface of the inner pipe includes at least one O-ring or at least two O-rings.

Figure 10:
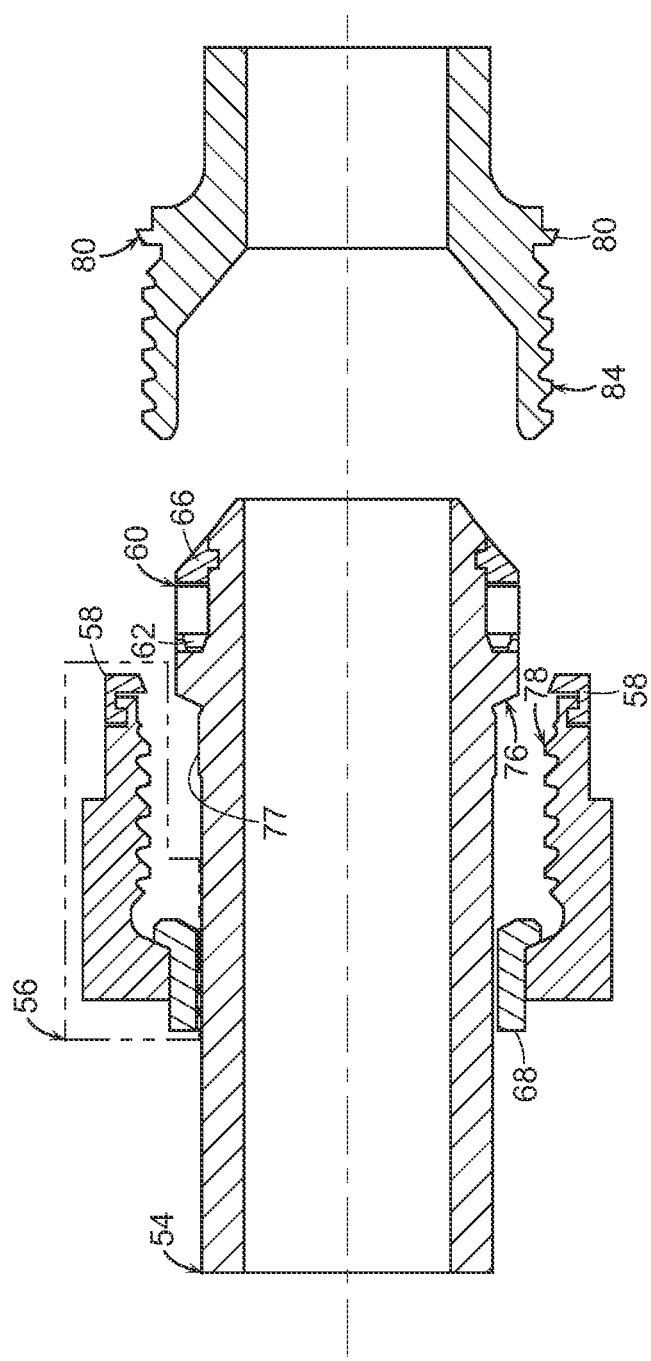
FIG. 10 shows an illustrative diagrammatic side sectional view similar to that shown in FIG. 9 with the inner pipe and outer sleeve uncoupled.
Figure 11:
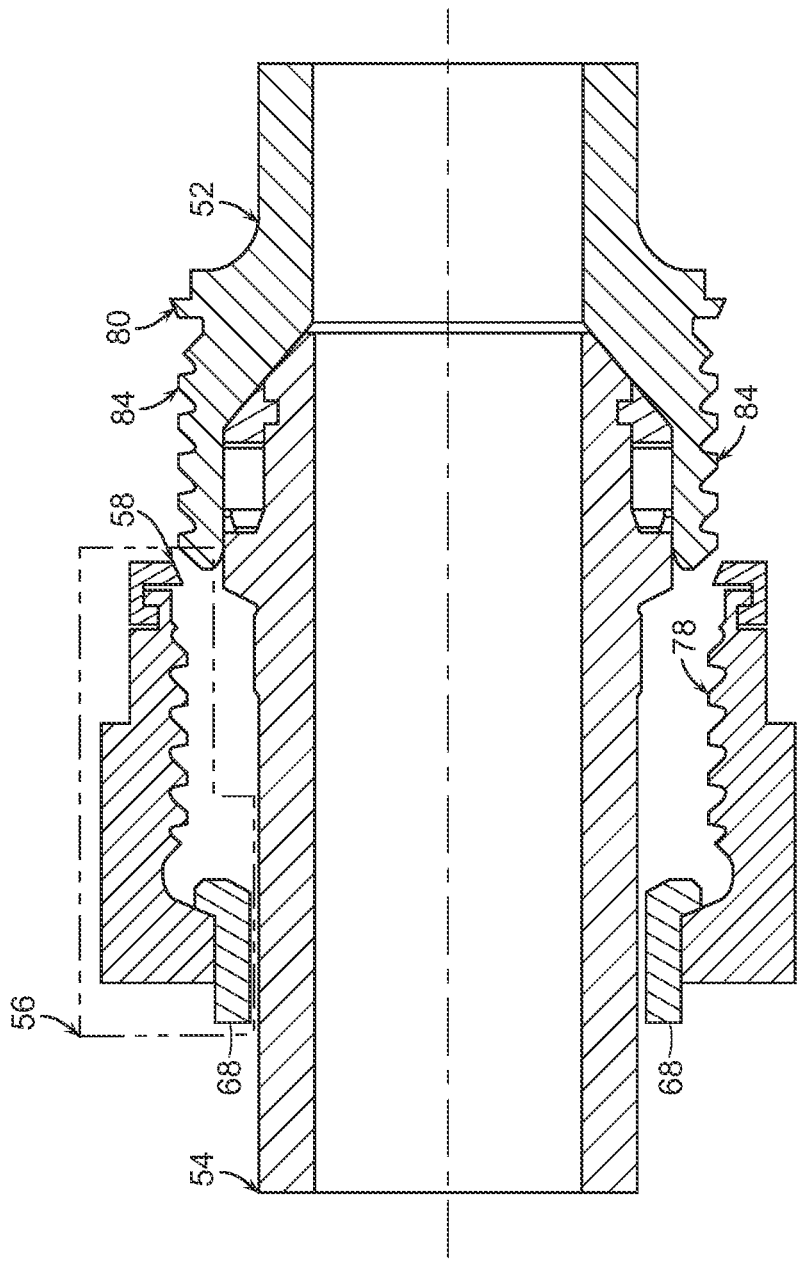
FIG. 11 shows an illustrative diagrammatic side sectional view similar to that shown in FIG. 11 with the inner pipe and outer sleeve beginning to engage one another.
Figure 12:
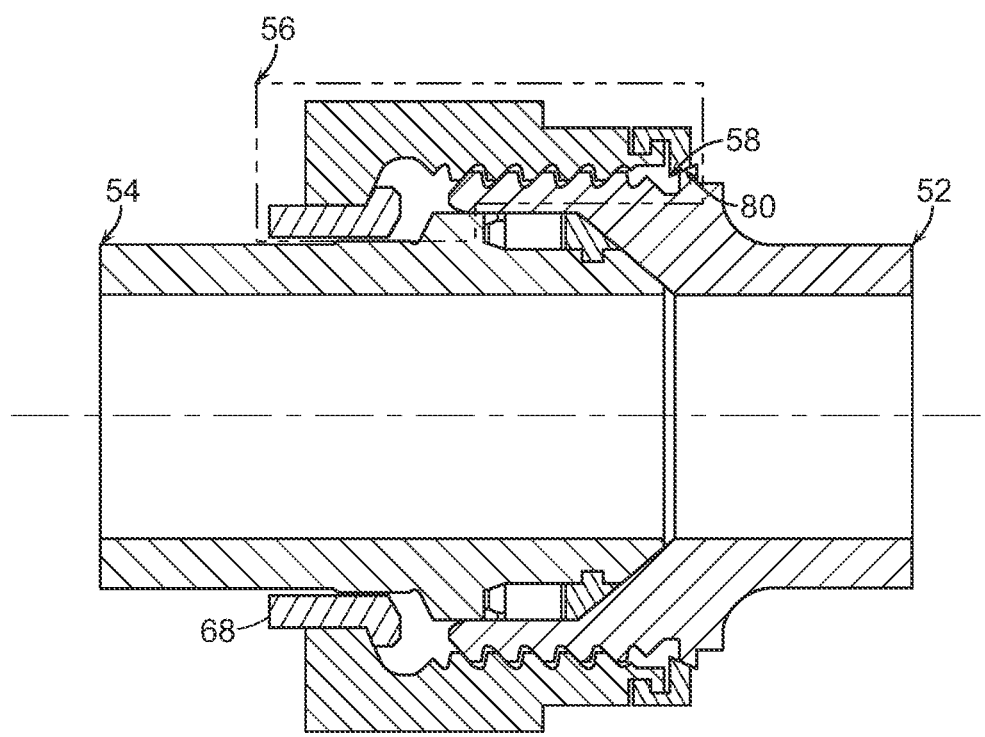
FIG. 12 shows an illustrative diagrammatic side sectional view similar to that shown in FIG. 11 with the inner pipe and outer sleeve coupled.
Figure 13:
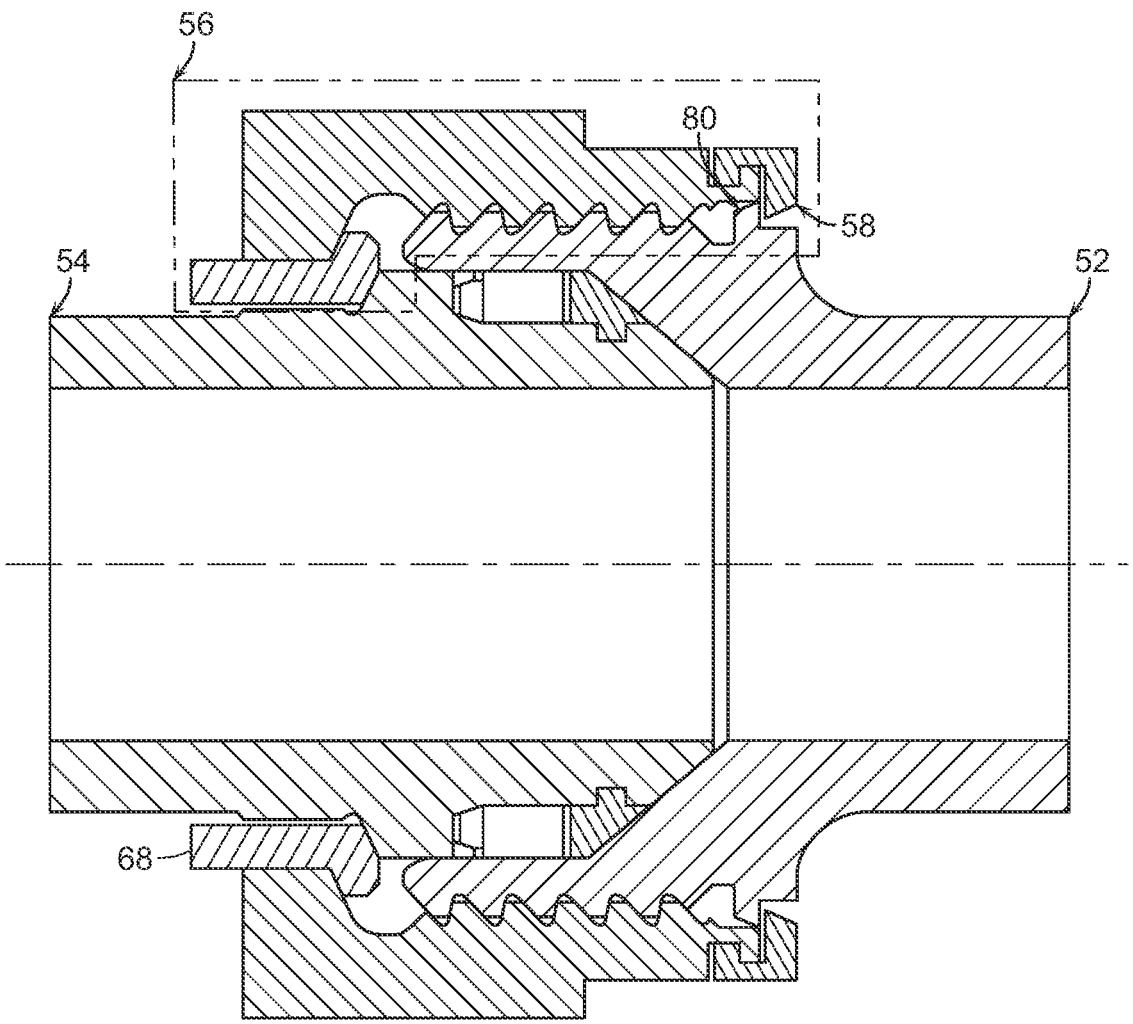
FIG. 13 shows an illustrative diagrammatic side sectional view similar to that shown in FIG. 11 with the inner pipe and outer sleeve beginning coupled and locked.

In accordance with a further embodiment, and with reference to FIGS. 9-13, the invention provides a non-preloaded threaded pipe connection system 50 that includes a connection pin 54 and an outer sleeve 56 attached thereto, as well as a connection box 52. With reference to FIG. 10, the connection box is coupled to the connection pin via threads 78 on the interior of the outer sleeve 56 and the outside of the connection box 52. The connection pin 54 includes a load shoulder element 66, as well as a seal ring 60 and a backup ring 62. When engaged, the shoulder element 66 is urged against an inner surface of the connection box 52 as shown in FIG. 13. A spacer ring 68 on the outer sleeve 56 seals against shoulder elements 76, 77 on the inner surface of the outer sleeve 54. With reference to FIG. 13, once coupled together, an entry shoulder 80 on the connection box is urged past a split ring locking element 58 on the outer sleeve 56 to lock the components together.

With the outer sleeve assembly retracted away from the pin load shoulder therefore, the seal end of the pin is inserted into the seal bore of the box. With the pin fully seating in the box, the outer sleeve is threaded on to the box until the load shoulder on the outer sleeve lands out on the load shoulder on the pin. As the outer sleeve is threaded onto the connection box, the split positive hold-down ring is spread open by the shown angled surfaces and will snap back into place once the connection is completely made up. This ring will prevent accidental uncoupling of the connection.

To uncouple the connection, the split positive hold-down ring is opened using a pair of splitter pliers or other device. The outer sleeve is then unthreaded from the box allowing the pin to be removed from the box.

Figure 14:
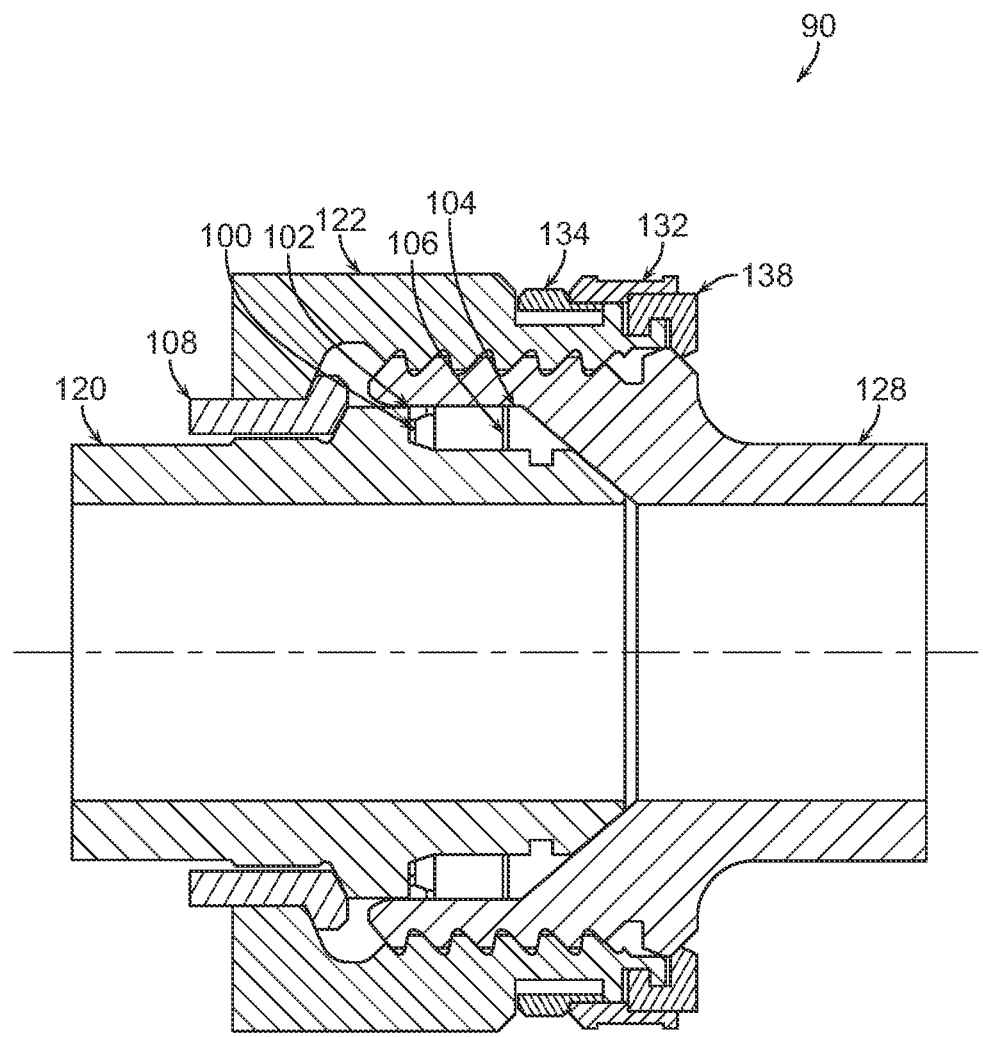
FIG. 14 shows an illustrative diagrammatic side sectional view of a non-preloaded threaded pipe connection in accordance with a further embodiment of the present invention including a split seal ring and a lock ring.
Figure 15:
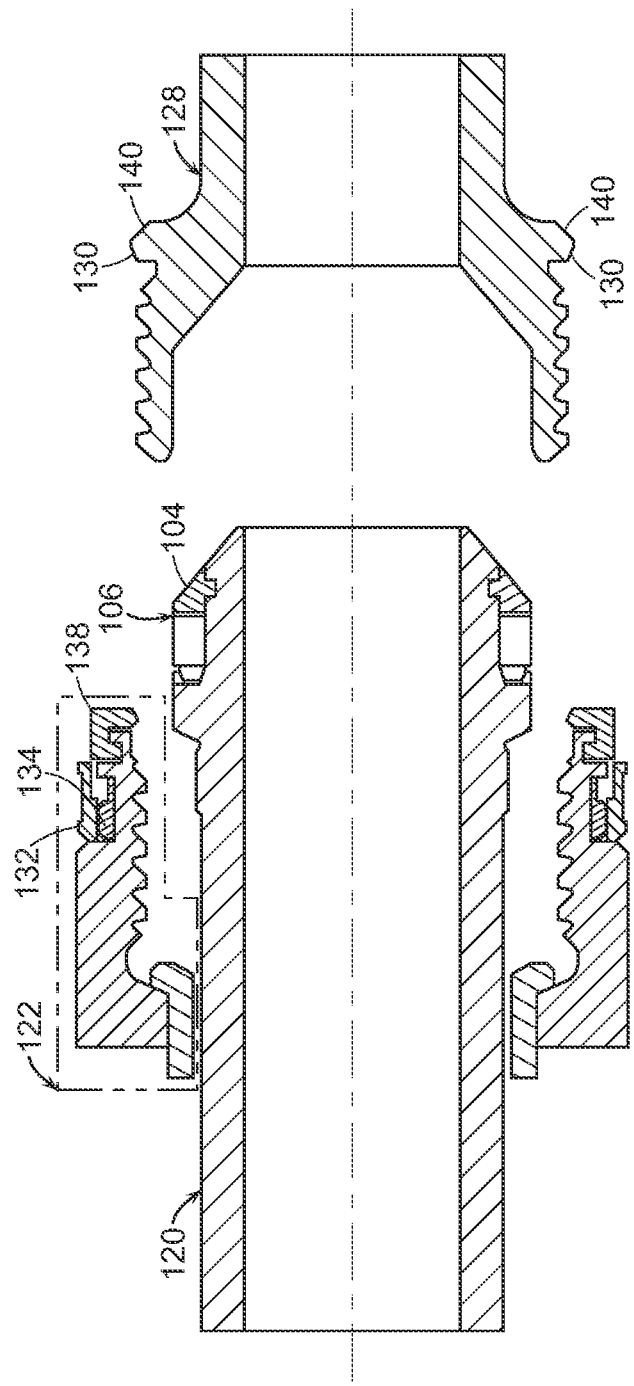
FIG. 15 shows an illustrative diagrammatic side sectional view similar to that shown in FIG. 14 with the inner pipe and outer sleeve uncoupled.

In accordance with a further embodiment, and with reference to FIGS. 14-19, the invention provides a system 90 that includes that includes a connection pin 120 and an outer sleeve 122 attached thereto, as well as a connection box 128. With reference to FIG. 15, the connection box is coupled to the connection pin via threads on the interior of the outer sleeve 122 and the outside of the connection box 128. The connection pin 120 includes a load shoulder element 104, as well as a seal ring 106 and a backup ring 100, which provide a seal when the connection box and the connection pin are firmly engaged as shown at 102. When engaged, the shoulder element 104 is urged against an inner surface of the connection box 122 as shown in FIG. 14. A spacer ring 108 on the outer sleeve 122 seals against shoulder elements on the inner surface of the outer sleeve 122 as well as the outer surface of connection pin 120.

Figure 16:
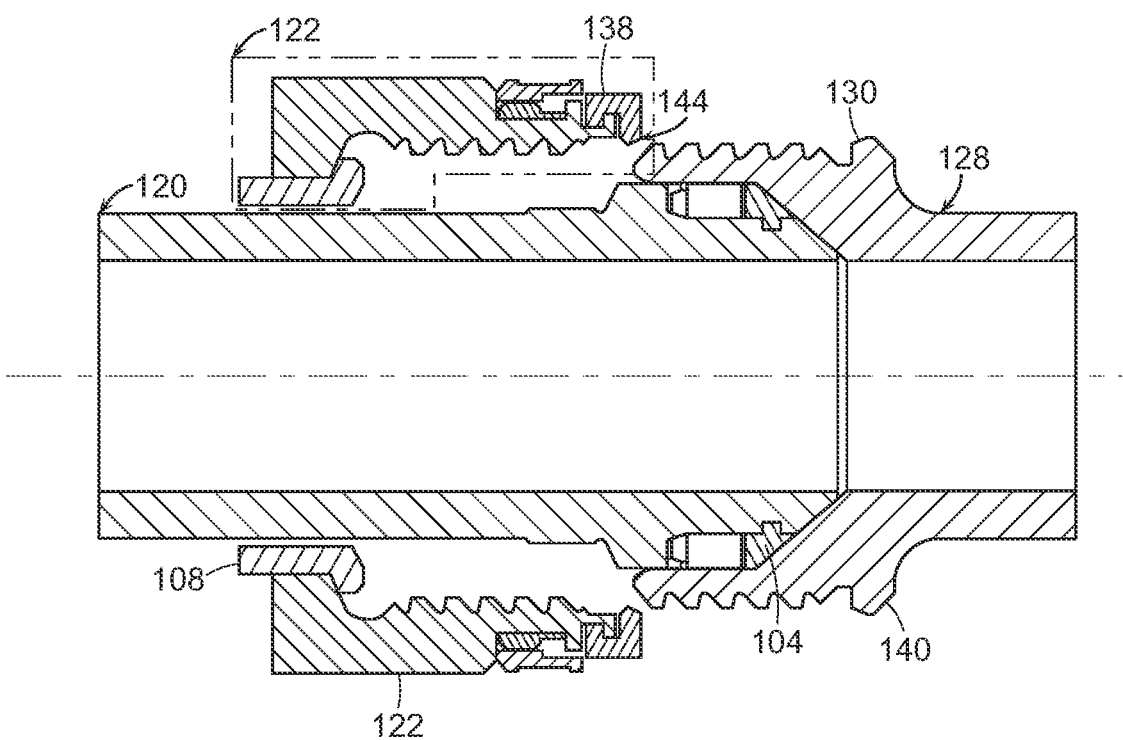
FIG. 16 shows an illustrative diagrammatic side sectional view similar to that shown in FIG. 14 with the inner pipe and outer sleeve beginning to engage one another.
Figure 17:
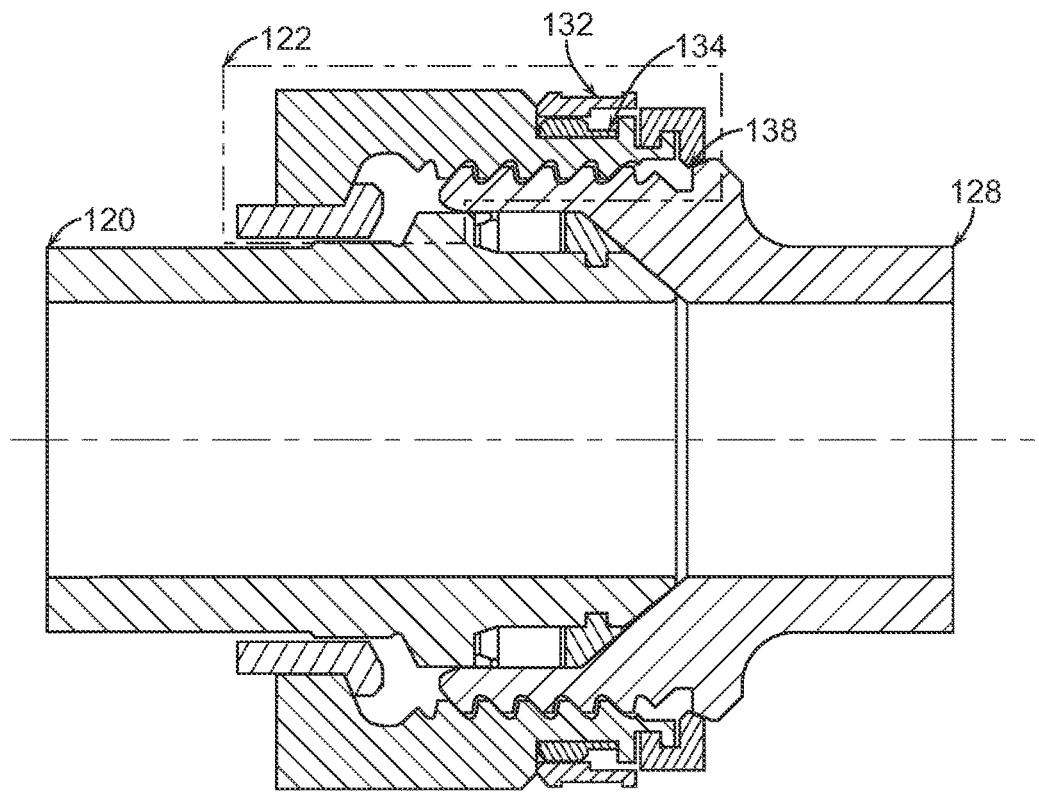
FIG. 17 shows an illustrative diagrammatic side sectional view similar to that shown in FIG. 14 with the inner pipe and outer sleeve coupled.
Figure 18:
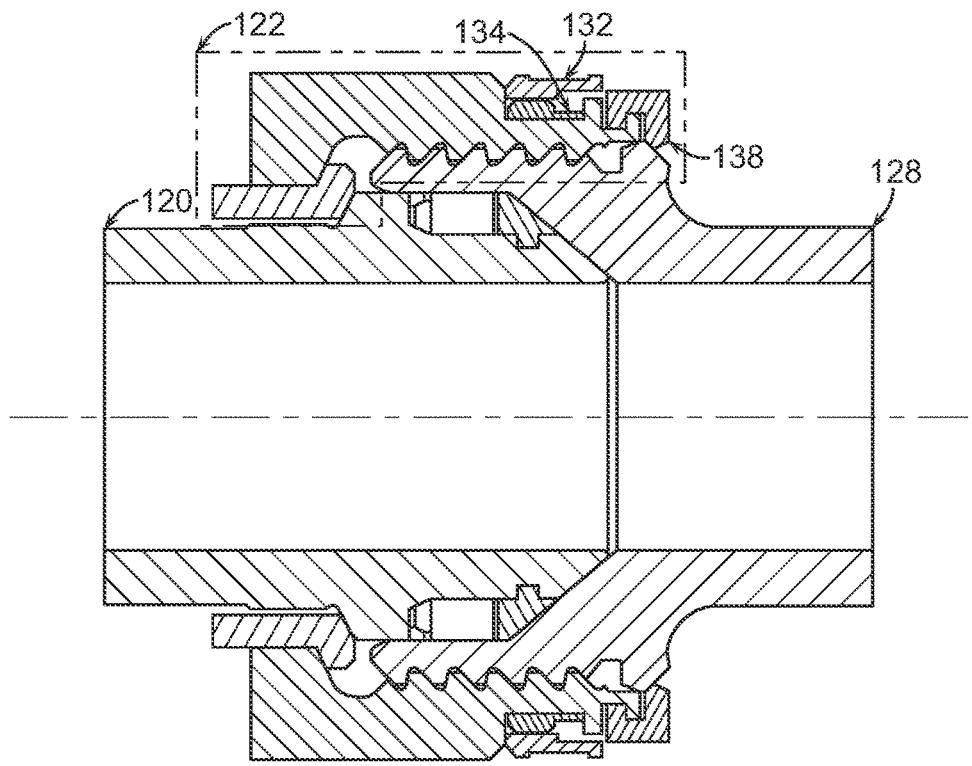
FIG. 18 shows an illustrative diagrammatic side sectional view similar to that shown in FIG. 14 with the inner pipe and outer sleeve beginning coupled and having a locking mechanism engaged.
Figure 19:
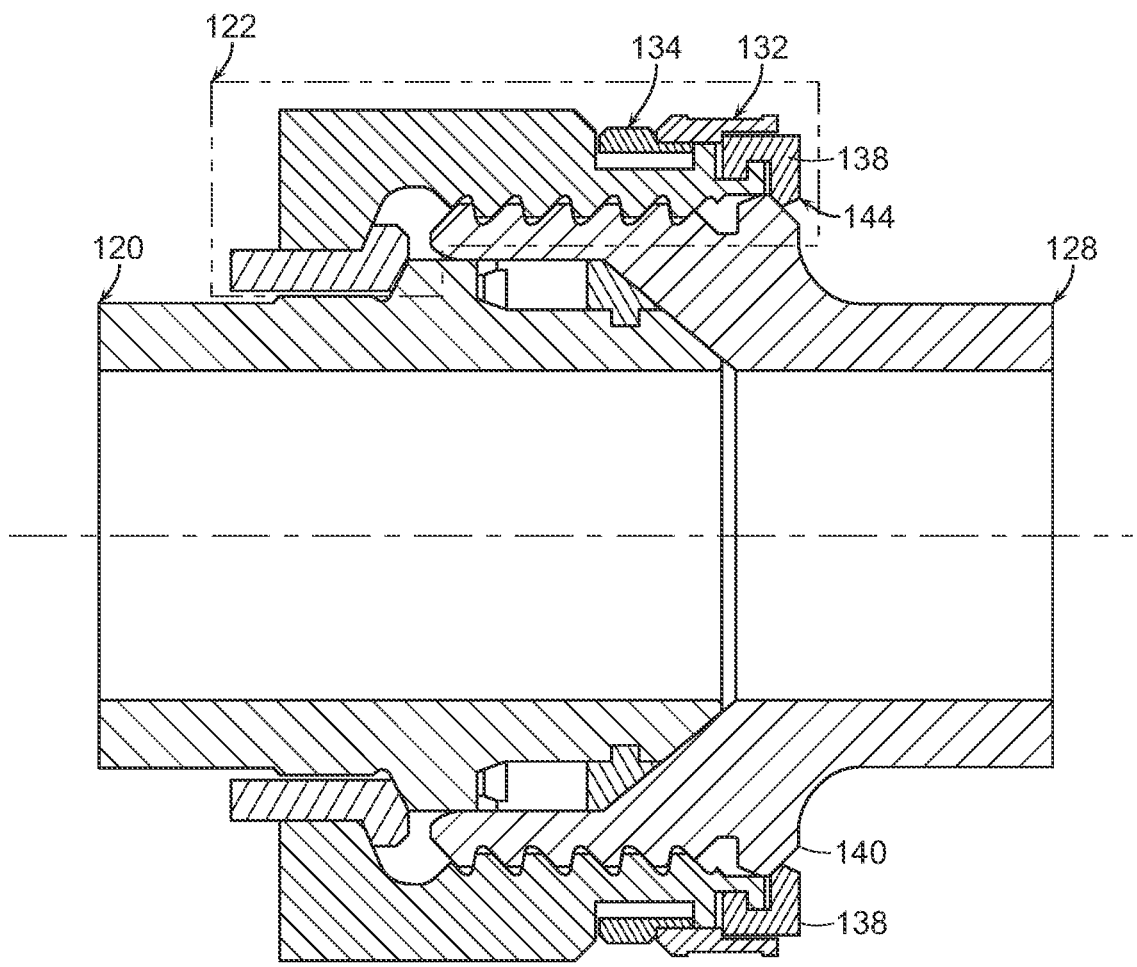
FIG. 19 shows an illustrative diagrammatic side sectional view similar to that shown in FIG. 14 with the inner pipe and outer sleeve beginning coupled and fully locked.
Figure 20:
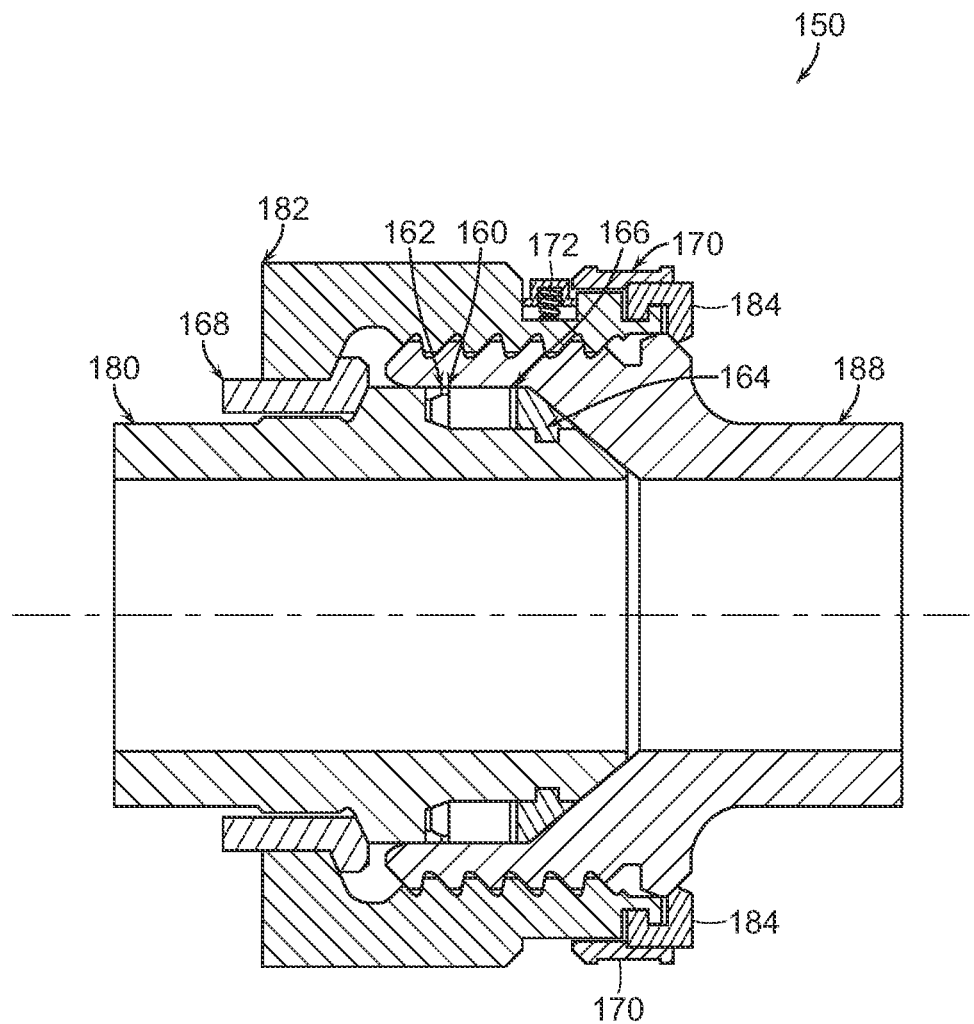
FIG. 20 shows an illustrative diagrammatic side sectional view of a non-preloaded threaded pipe connection in accordance with a further embodiment of the present invention including a split seal ring, a lock ring and a spring loaded lock ring lock.

As shown in FIGS. 15 and 16, the connection box 128 is first slid on to the connection pin 120 against the shoulder element of the connection pin 120. As shown in FIG. 16, threads on the outer surface of the connection box are threaded into threads on the inner surface of the outer sleeve 128 to couple the components together. With reference to FIGS. 17 and 18, once coupled together, the entry shoulder on the connection box is urged past a split ring locking element 138 on the outer sleeve 122 to lock the components together. In particular, an entry should 130 on the connection box engages and is urged past the split ring locking element 138. As shown in FIG. 19, a retaining ring 132 is then slid axially over the split ring locking element 138, whereupon a compressed locking member 134 is urged radially outwardly to lock the retaining ring 132 in place. The split ring locking element 138 also includes a backside shoulder 144 against which an exit shoulder 140 of the connection box 128 may be urged to separate the connection box 128 from the connection pin 120 when the retaining ring 132 is moved back over the locking member 134. In this way, the connection may be undone by releasing the retaining ring 132.

With the outer sleeve assembly retracted away from the pin load shoulder therefore, the seal end of the pin is inserted into the seal bore of the box. With the pin fully seated in the box, the outer sleeve is threaded on to the box until the load shoulder on the outer sleeve lands out on the load shoulder on the pin. As the outer sleeve is threaded onto the connection box, the split positive hold-down ring is spread open by the shown angled surfaces and will snap back into place once the connection is completely made up. The split positive hold-down ring will prevent accidental uncoupling of the connection. The support ring is then moved into position over the split positive hold-down ring allowing the split lock ring to spring open locking the support ring in place. The combination of the support ring and the split lock ring prevent the split positive hold-down ring from unintentionally splitting open allowing the outer sleeve assembly to uncouple from the box.

To uncouple the connection, the split lock ring is collapsed in order to move the support ring up from behind the split positive hold-down ring. The outer sleeve assembly is unthreading from the box. The angle on the split positive hold-down ring allows for it to automatically split open while unthreading the connection, thus preventing the need for any tool to split open the split positive hold-down ring prior to decoupling.

Figure 21:
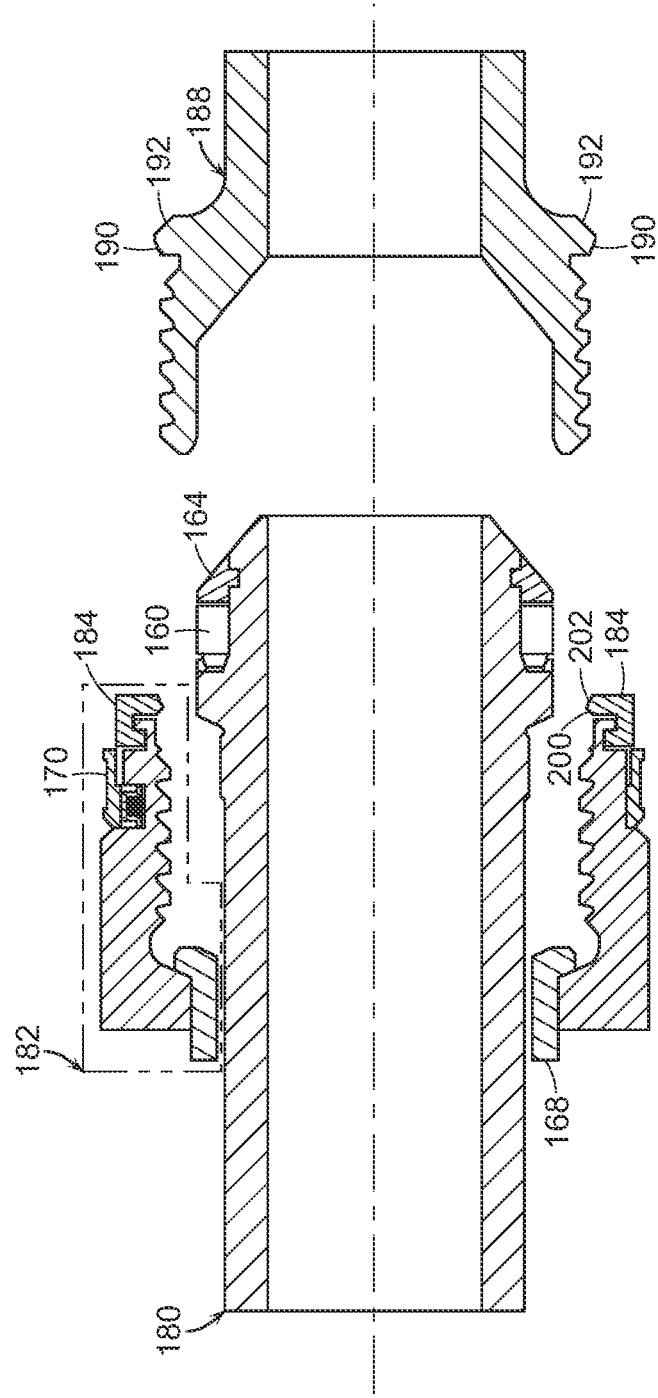
FIG. 21 shows an illustrative diagrammatic side sectional view similar to that shown in FIG. 20 with the inner pipe and outer sleeve uncoupled.

In accordance with a further embodiment, and with reference to FIGS. 20-25, the invention provides a system 150 that includes a connection pin 180 and an outer sleeve 182 attached thereto, as well as a connection box 188. With reference to FIG. 21, the connection box is coupled to the connection pin via threads on the interior of the outer sleeve 182 and the outside of the connection box 188. The connection pin 180 includes a load shoulder element 164, as well as a seal ring 160 and a backup ring 162, which provide a seal when the connection box and the connection pin are firmly engaged. When engaged, the shoulder element 164 is urged against an inner surface of the connection box 188 as shown in FIGS. 20 and 22-25. A spacer ring 168 on the outer sleeve 182 seals against shoulder elements on the inner surface of the outer sleeve 182 as well as the outer surface of connection pin 180.

Figure 22:
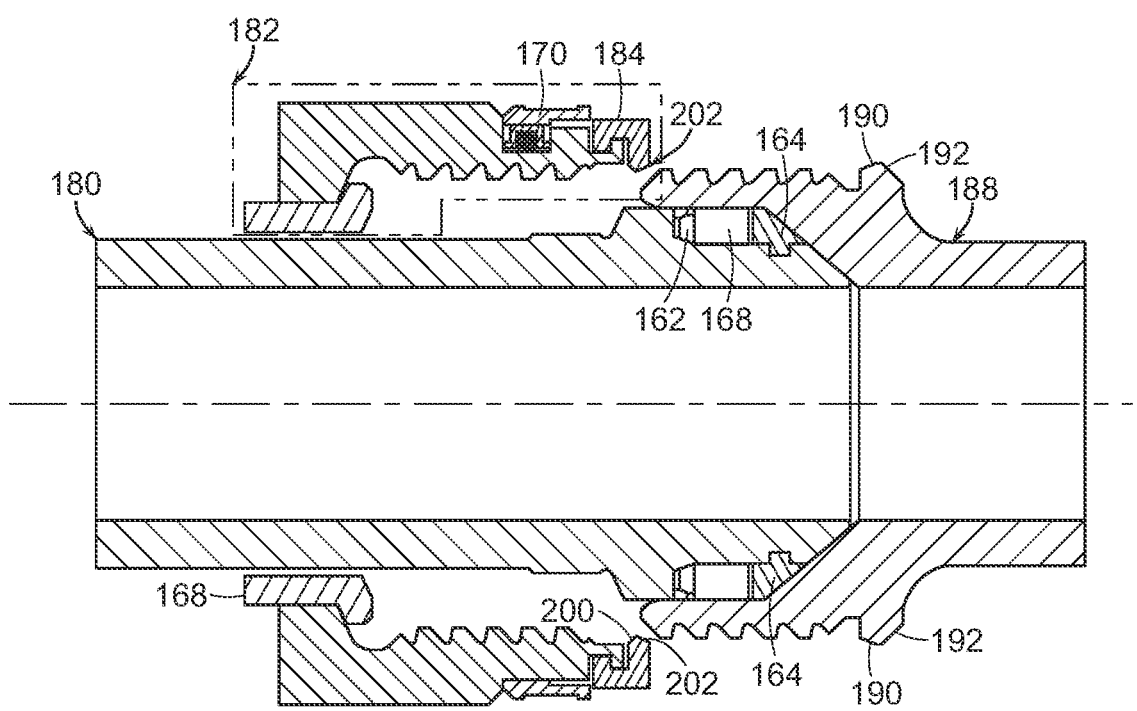
FIG. 22 shows an illustrative diagrammatic side sectional view similar to that shown in FIG. 20 with the inner pipe and outer sleeve beginning to engage one another.
Figure 23:
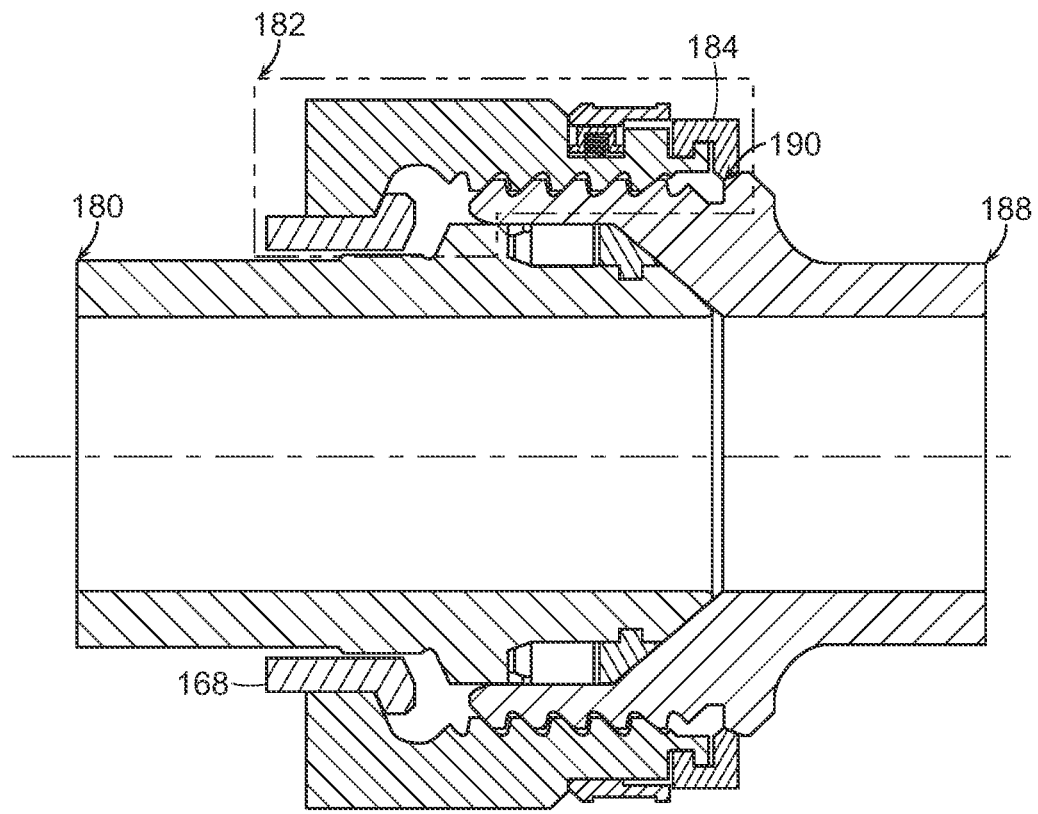
FIG. 23 shows an illustrative diagrammatic side sectional view similar to that shown in FIG. 20 with the inner pipe and outer sleeve being further engaged with one another.
Figure 24:
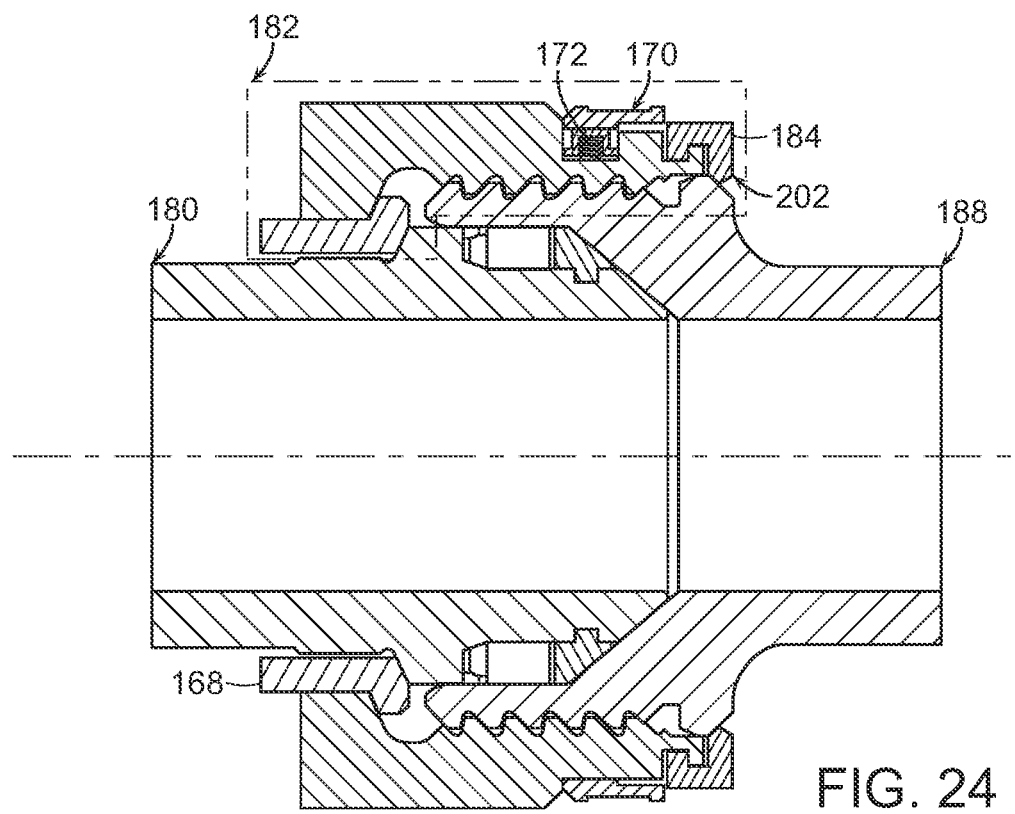
FIG. 24 shows an illustrative diagrammatic side sectional view similar to that shown in FIG. 20 with the inner pipe and outer sleeve coupled.
Figure 25:
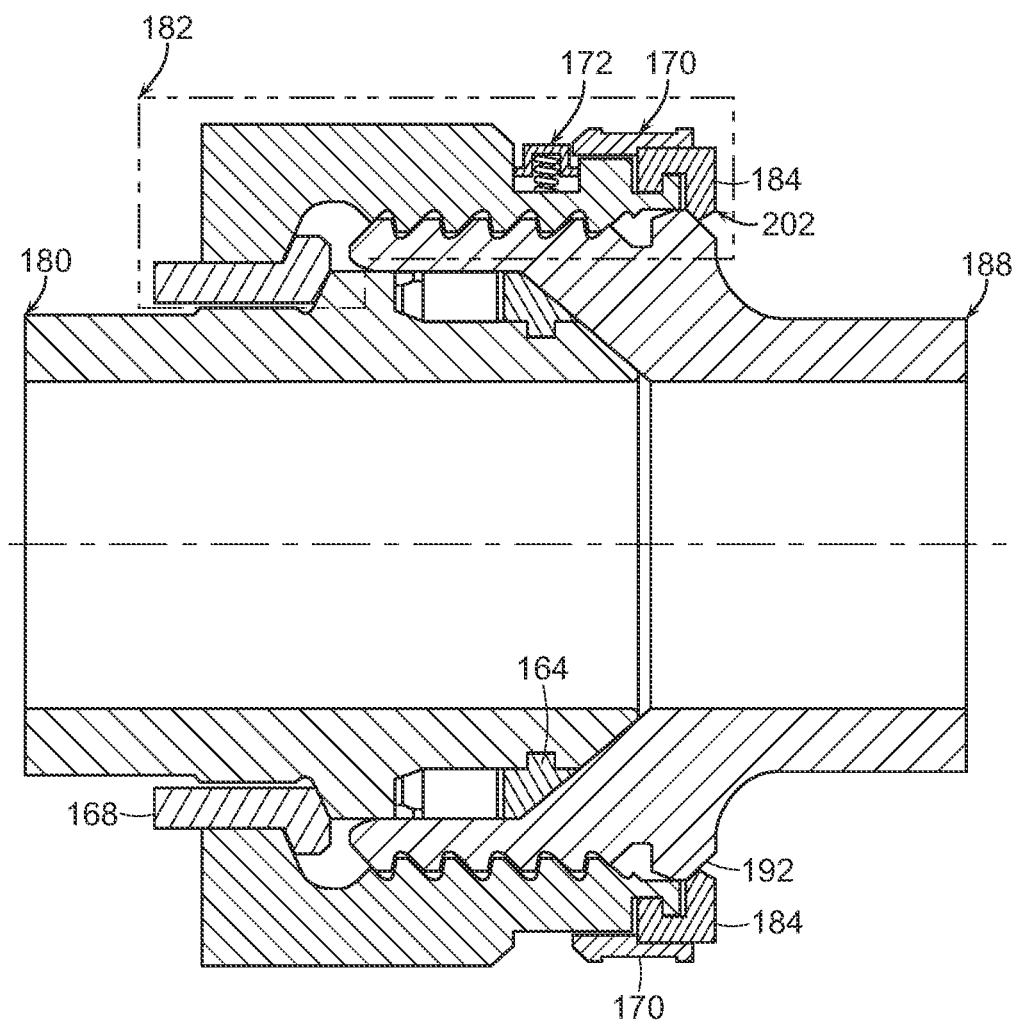
FIG. 25 shows an illustrative diagrammatic side sectional view similar to that shown in FIG. 20 with the inner pipe and outer sleeve beginning coupled and locked.

As shown in FIGS. 22 and 23, the connection box 188 is first slid on to the connection pin 180 against the shoulder element 164 of the connection pin 180. As shown in FIG. 23, threads on the outer surface of the connection box are threaded into threads on the inner surface of the outer sleeve 182 to couple the components together. With reference to FIGS. 23 and 24, once coupled together, the entry shoulder 190 on the connection box is urged past a split ring locking element 184 on the outer sleeve 182 to lock the components together. In particular, the entry should 190 on the connection box engages and is urged past the split ring locking element 184 at a surface 200. As shown in FIG. 25, a retaining ring 170 is then slid axially over the split ring locking element 184, whereupon a compressed locking member 172 is urged radially outwardly to lock the retaining ring 170 in place. The split ring locking element 184 also includes a backside shoulder 202 against which an exit shoulder 192 of the connection box 188 may be urged to separate the connection box 188 from the connection pin 180 when the retaining ring 170 is moved back over the locking member 172. In this way, the connection may be undone by releasing the retaining ring 170.

With the outer sleeve assembly retracted away from the pin load shoulder therefore, the seal end of the pin is inserted into the seal bore of the box. With the pin fully seated in the box, the outer sleeve is threaded on to the box until the load shoulder on the outer sleeve lands out on the load shoulder on the pin. As the outer sleeve is threaded onto the connection box, the split positive hold-down ring is spread open by the shown angled surfaces and will snap back into place once the connection is completely made up. The split positive hold-down ring will prevent accidental uncoupling of the connection. The support ring is then moved into position over the split positive hold-down ring allowing the split lock ring to spring open locking the retaining ring in place. The combination of the retaining ring and the split lock ring prevent the split positive hold-down ring from unintentionally splitting open allowing the outer sleeve assembly to uncouple from the box.

To uncouple the connection, the split lock ring is collapsed in order to move the retaining ring up from behind the split positive hold-down ring. The outer sleeve assembly is then unthreaded from the box. The angle on the split positive hold-down ring allows for it to automatically split open while unthreading the connection, thus preventing the need for any tool to split open the split positive hold-down ring prior to decoupling.

Those skilled in the art will appreciate that numerous modifications and variations may be made to the above disclosed embodiments without departing from the spirit and scope of the present invention.

What is claimed is:

1. A temporary piping system for use in a high pressure fluidic system, said temporary piping system comprising:
   a connection pin including a first sealing surface;
   a connection box including external threads and a second sealing surface for engaging the first sealing surface of the connection pin to create a fluidic seal;
   an outer sleeve including internal threads for threadingly engaging the external threads of the connection box to secure the box with respect to the connection pin to maintain the fluidic seal; and
   a locking system for preventing the connection box from being separated from the connection pin;
   wherein the locking system includes a locking ring beyond which an entry shoulder of one of the connection box and the outer sleeve may be urged, wherein the locking ring retains the connection box in communication with the connection pin together once the entry shoulder passes the locking ring;
   wherein the locking system includes a retaining ring for retaining the locking ring in a locked position;
   wherein the retaining ring is movable axially with respect to the connection box; and
   wherein the locking system includes a compressed locking member that inhibits the retaining ring from moving away from the connection box.

2. The temporary piping system as claimed in claim 1, wherein the locking member is biased in a radially outward direction.

3. The temporary piping system as claimed in claim 1, wherein the connection pin includes an external shoulder that indirectly engages an internal shoulder of the outer sleeve.

4. The temporary piping system as claimed in claim 3, wherein the external shoulder of the connection pin engages the internal shoulder of the outer sleeve via a spacer ring.

5. The temporary piping system as claimed in claim 4, wherein the outer sleeve includes at least one securing means for securing the spacer ring against the shoulder of the inner pipe.

6. The temporary piping system as claimed in claim 1, wherein the connection pin includes an external shoulder that engages an inner shoulder of the box.

7. A method of providing temporary piping in a high pressure fluidic system, said method comprising:
   providing a connection pin including a first sealing surface;
   providing a connection box including external threads and a second sealing surface for engaging the first sealing surface of the connection pin to create a fluidic seal;
   providing an outer sleeve including internal threads for threadingly engaging the external threads of the connection box to secure the box with respect to the connection pin to maintain the fluidic seal;
   preventing the connection box from being separated from the connection pin using a locking system, including:
   providing the locking system with a locking ring beyond which an entry shoulder of one of the connection box and the outer sleeve may be urged, wherein the locking ring retains the connection box in communication with the connection pin together once the entry shoulder passes the locking ring;
   providing the locking system with a retaining ring for retaining the locking ring in a locked position;
   providing that the retaining ring is movable axially with respect to the connection box; and
   providing that the locking system includes a compressed locking member that inhibits the retaining ring from moving away from the connection box.

8. The method as claimed in claim 7, wherein the locking member is biased in a radially outward direction.

9. The method as claimed in claim 7, wherein the connection pin includes an external shoulder that indirectly engages an internal shoulder of the outer sleeve.

10. The method as claimed in claim 9, wherein the external shoulder of the connection pin engages the internal shoulder of the outer sleeve via a spacer ring.

11. The method as claimed in claim 10, wherein the outer sleeve includes at least one securing device for securing the spacer ring against the shoulder of the inner pipe.

12. The method as claimed in claim 7, wherein the connection pin includes an external shoulder that engages an inner shoulder of the box.

13. A temporary piping system comprising:
   a connection pin including a first sealing surface;
   a connection box including external threads and a second sealing surface for engaging the first sealing surface of the connection pin;
   an outer sleeve including internal threads for threadingly engaging the external threads of the connection box to secure the box with respect to the connection pin; and
   a locking system for preventing the connection box from being separated from the connection pin, said locking system including;
      a locking ring beyond which an entry shoulder of one of the connection box and the outer sleeve may be urged, wherein the locking ring retains the connection box in communication with the connection pin together once the entry shoulder passes the locking ring;
      a retaining ring for retaining the locking ring in a locked position, wherein the retaining ring is movable axially with respect to the connection box; and
      a compressed locking member that inhibits the retaining ring from moving away from the connection box.

14. The temporary piping system as claimed in claim 13, wherein the locking member is biased in a radially outward direction.

15. The temporary piping system as claimed in claim 13, wherein the connection pin includes an external shoulder that indirectly engages an internal shoulder of the outer sleeve.

16. The temporary piping system as claimed in claim 15, wherein the external shoulder of the connection pin engages the internal shoulder of the outer sleeve via a spacer ring.

17. The temporary piping system as claimed in claim 16, wherein the outer sleeve includes at least one securing means for securing the spacer ring against the shoulder of the inner pipe.

18. The temporary piping system as claimed in claim 13, wherein the connection pin includes an external shoulder that engages an inner shoulder of the box.

\* \* \* \* \*